(12) United States Patent
Tang et al.

(10) Patent No.: US 11,737,083 B2
(45) Date of Patent: *Aug. 22, 2023

(54) CROSS-SLOT SCHEDULING FOR NEW RADIO

(71) Applicant: Apple inc., Cupertino, CA (US)

(72) Inventors: Jia Tang, San Jose, CA (US); Wei Zhang, Santa Clara, CA (US); Wei Zeng, Saratoga, CA (US); Haitong Sun, Cupertino, CA (US); Yuchul Kim, San Jose, CA (US); Ping Wang, San Jose, CA (US); Sreevalsan Vallath, Dublin, CA (US); Zhu Ji, Cupertino, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,494

(22) Filed: Jun. 29, 2022

(65) Prior Publication Data

US 2022/0330286 A1    Oct. 13, 2022

Related U.S. Application Data (63) Continuation of application No. 16/575,272, filed on Sep. 18, 2019, now Pat. No. 11,405,943.

(Continued)

(51) Int. Cl.
*H04W 72/12* (2023.01)
*H04W 72/1263* (2023.01)

(Continued)

(52) U.S. Cl.
CPC ... *H04W 72/1263* (2013.01); *H04W 52/0274* (2013.01); *H04W 72/0446* (2013.01);
(Continued)

(58) Field of Classification Search
CPC . H04W 72/1263; H04W 76/27; H04W 72/20; H04W 52/0274; H04W 80/02; H04W 88/02
See application file for complete search history.

(56) References Cited

U.S. PATENT DOCUMENTS 9,854,599 B2 * 12/2017 Suzuki ................. H04W 72/23
2002/0044568 A1    4/2002 Smiljanic
(Continued)

FOREIGN PATENT DOCUMENTS

CN    1278696    1/2001
CN    101800623    8/2010
(Continued)

OTHER PUBLICATIONS

Extended European Search Report for European Application No. 19200014.9, dated Feb. 17, 2020, 9 pgs.
(Continued)

*Primary Examiner* — Parth Patel
(74) *Attorney, Agent, or Firm* — Kowert, Hood, Munyon, Rankin & Goetzel, P.C.

(57) ABSTRACT

A user equipment device may determine whether to power down one or more components based at least on a scheduling parameter that includes an indication of cross-slot scheduling. The device may power down the one or more components prior to decoding control information during a slot for which the scheduling parameter indicates that cross-slot scheduling is in place.

20 Claims, 6 Drawing Sheets

PDSCH-Time Domain Resource Allocation List Information Element

```
-- ASN1START
-- TAG-PDSCH-TIMEDOMAINRESOURCE ALLOCATIONLIST-START

PDSCH-TimeDomaininResourceAllocationList  ::= SEQUENCE (SIZE(1..maxNrofDL-Allocations)) OF PDSCH-TimeDomaininResourceAllocation PDSCH-TimeDomaininResourceAllocation ::= SEQUENCE {
    k0                      INTEGER (0..32)
    mappingType             ENUMERATED {typeA, typeB},
    startSymbolAndLength    INTEGER (0...127)
}

-- TAG-PDSCH-TIMEDOMAINRESOURCEALLOCATIONLIST-STOP
-- ASN1STOP
```

Related U.S. Application Data (60) Provisional application No. 62/738,580, filed on Sep. 28, 2018.

(51) Int. Cl.
*H04W 76/27* (2018.01)
*H04W 52/02* (2009.01)
*H04W 72/0446* (2023.01)
*H04W 80/02* (2009.01)
*H04W 88/02* (2009.01)
*H04W 72/20* (2023.01)

(52) U.S. Cl.
CPC .......... *H04W 72/20* (2023.01); *H04W 76/27* (2018.02); *H04W 80/02* (2013.01); *H04W 88/02* (2013.01)

(56) References Cited

U.S. PATENT DOCUMENTS

| | | | | |
|---|---|---|---|---|
| 2014/0269369 | A1* | 9/2014 | Ghosh | H04W 74/08 370/252 |
| 2017/0332396 | A1* | 11/2017 | Liao | H04L 27/26025 |
| 2017/0367046 | A1* | 12/2017 | Papasakellariou | H04W 72/0446 |
| 2018/0249418 | A1* | 8/2018 | Hsieh | H04W 52/0274 |
| 2018/0262304 | A1* | 9/2018 | Wang | H04L 1/1861 |
| 2018/0279304 | A1 | 9/2018 | Lee | |
| 2018/0317207 | A1* | 11/2018 | Liao | H04L 5/001 |
| 2018/0332655 | A1* | 11/2018 | Ang | H04W 52/0216 |
| 2018/0343653 | A1* | 11/2018 | Guo | H04W 72/542 |
| 2018/0368112 | A1* | 12/2018 | Sebeni | H04W 52/0209 |
| 2019/0014576 | A1* | 1/2019 | Liao | H04L 1/1861 |
| 2019/0037561 | A1* | 1/2019 | Jung | H04L 1/1896 |
| 2019/0059129 | A1* | 2/2019 | Luo | H04B 7/0695 |
| 2019/0082431 | A1* | 3/2019 | Yi | H04J 11/00 |
| 2019/0090299 | A1* | 3/2019 | Ang | H04L 5/0094 |
| 2019/0191433 | A1* | 6/2019 | Park | H04L 27/2607 |
| 2019/0199488 | A1 | 6/2019 | Martin et al. | |
| 2019/0215847 | A1* | 7/2019 | Abdoli | H04W 72/0453 |
| 2019/0223097 | A1* | 7/2019 | Yi | H04W 52/0216 |
| 2019/0261405 | A1* | 8/2019 | Ang | H04W 72/0446 |
| 2019/0312635 | A1* | 10/2019 | Ang | H04L 5/0053 |
| 2019/0357303 | A1* | 11/2019 | Xiong | H04W 80/08 |
| 2020/0008232 | A1* | 1/2020 | Takeda | H04W 80/08 |
| 2020/0008233 | A1* | 1/2020 | Xiong | H04W 72/0446 |
| 2020/0029315 | A1* | 1/2020 | Lin | H04L 1/0075 |
| 2020/0053755 | A1* | 2/2020 | Ang | H04W 72/1273 |
| 2020/0059345 | A1* | 2/2020 | Pelletier | H04L 5/0064 |
| 2020/0092073 | A1* | 3/2020 | Papasakellariou | H04L 5/0092 |
| 2020/0107340 | A1* | 4/2020 | Tang | H04W 76/27 |
| 2020/0205076 | A1* | 6/2020 | Chen | H04W 52/02 |
| 2020/0213989 | A1* | 7/2020 | Choi | H04L 5/0005 |
| 2020/0274652 | A1* | 8/2020 | Park | H04L 5/0055 |
| 2020/0288479 | A1* | 9/2020 | Xi | H04W 76/27 |
| 2020/0305140 | A1* | 9/2020 | Song | H04W 72/20 |
| 2020/0344761 | A1* | 10/2020 | Amuru | H04B 7/0452 |
| 2020/0351774 | A1* | 11/2020 | Liao | H04W 76/27 |
| 2020/0358562 | A1* | 11/2020 | Peng | H04W 76/27 |
| 2020/0374918 | A1* | 11/2020 | Ang | H04W 52/0229 |
| 2021/0022080 | A1* | 1/2021 | Chang | H04W 52/0229 |
| 2021/0120489 | A1* | 4/2021 | Jiang | H04B 7/088 |
| 2021/0153267 | A1* | 5/2021 | Zhang | H04W 72/0466 |
| 2021/0250887 | A1* | 8/2021 | Xiong | H04W 48/16 |

FOREIGN PATENT DOCUMENTS

| | | |
|---|---|---|
| CN | 103298131 | 9/2013 |
| CN | 103841562 | 6/2014 |
| CN | 104541545 | 4/2015 |
| CN | 104702394 | 6/2015 |
| CN | 106664525 | 5/2017 |
| WO | 2018144203 | 8/2018 |
| WO | 2018175768 | 9/2018 |
| WO | 2020033893 | 2/2020 |

OTHER PUBLICATIONS

Nokia et al: "PDSCH scheduling timing in NR", 3GPP Draft; R1-1708522_PDSCH_Schedultiming_Final, 3rd Generation Partnership Project (3GPP), Mobile Competence Centre; 650, Route Des Lucioles; F-06921 Sophia-Antipolis Cedex; France, vol. RAN WG1, No. Hangzhou; May 15-19, 2017, May 14, 2017, XP051273714, 3 pgs.

Qualcomm Incorporated: "UE Power Saving during Active State", 3GPP Draft R1-1713481_UE_Power_Saving_During_Active_State, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21-25, 2017, Aug. 20, 2017, XP051316281, 6 pgs.

Qualcomm Incorporated: "Advanced Grant Indication for UE Power Saving", 3GPP Draft R1-1720709_Advanced_Grant_Indication_for_UE_Power_Saving, 3rd Generation Partnership Project (3GPP), Mobile Competence Centre; 650, Route Des Lucioles; F-06921 Sophia-Antipolis Cedex; F, vol. RAN WG1, No. Reno, NV, USA; Nov. 27-Dec. 1, 2017, Nov. 18, 2017, XP051370168, 5 pgs.

First Office Action for CN Patent Application No. 201910922279.1; 16 pages; dated Dec. 8, 2022.

CATT,"[89-20] email discussion:Group-common PDCCH for NR", 3GPP TSG RAN WG1 Meeting #AH_NR2 R1-1710968, Qingdao, P.R. China, 22 pages, Jun. 27, 2017.

Communication pursuant to Article 94(3) for EP Patent Application No. 19200014.9; 8 pages; dated Jul. 26, 2022.

Nokia et al. "PDSCH scheduling timing in NR"; 3GPP TSG RAN WG1#89 R1-1708522; Hangzhou, P.R. China; 3 pages; May 15, 2017.

Qualcomm Incorporated "UE Power Saving during Active State"; 3GPP TSG RAN WG1 Meeting #90 R1-1713481; Prague, Czech Republic; 6 pages; Aug. 21, 2017.

Qualcomm Incorporated "Advanced Grant Indication for UE Power Saving"; 3GPP TSG RAN WG1 #91 R1-1720709; Reno, USA; 5 pages; Nov. 27, 2017.

* cited by examiner

PDSCH-Time Domain Resource Allocation List Information Element

```
-- ASN1START
-- TAG-PDSCH-TIMEDOMAINRESOURCEALLOCATIONLIST-START

PDSCH-TimeDomainResourceAllocationList  ::= SEQUENCE (SIZE(1..maxNrofDL-Allocations)) OF PDSCH-TimeDomainResourceAllocation PDSCH-TimeDomainResourceAllocation ::= SEQUENCE {
    k0                      INTEGER (0..32)
    mappingType             ENUMERATED {typeA, typeB},
    startSymbolAndLength    INTEGER (0..127)
}

-- TAG-PDSCH-TIMEDOMAINRESOURCEALLOCATIONLIST-STOP
-- ASN1STOP
```

FIG. 7

| Index | Meaning |
|---|---|
| Same as previous | K0 will not change for the next DL grant |
| Toggle | K0 can change for the next DL grant |

FIG. 8

CROSS-SLOT SCHEDULING FOR NEW RADIO

PRIORITY CLAIM INFORMATION

This application is a continuation of U.S. patent application Ser. No. 16/575,272, entitled "Cross-Slot Scheduling for New Radio," filed Sep. 18, 2019, which claims priority to U.S. provisional patent application Ser. No. 62/738,580, entitled "Wideband Transmission with Narrowband Monitoring, and Cross-Slot Scheduling for New Radio Unlicensed Spectrum (NRU)," filed Sep. 28, 2018, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to cross-slot scheduling enhancements for New Radio (NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY OF THE INVENTION

Embodiments relate to apparatuses, systems, and methods to perform various communication techniques. A wireless device may receive a scheduling parameter from a base station. The parameter may indicate cross-slot scheduling, same slot scheduling, and/or related information. Based on the scheduling parameter, the wireless device may determine whether to power off one or more components after receiving control information. The wireless device may receive control information from the base station and power off the component(s) according to the determination. The wireless device may decode the control information.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
BS: Base Station
BSR: Buffer Size Report BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAT: Radio Access Technology
RF: Radio Frequency
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™ etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
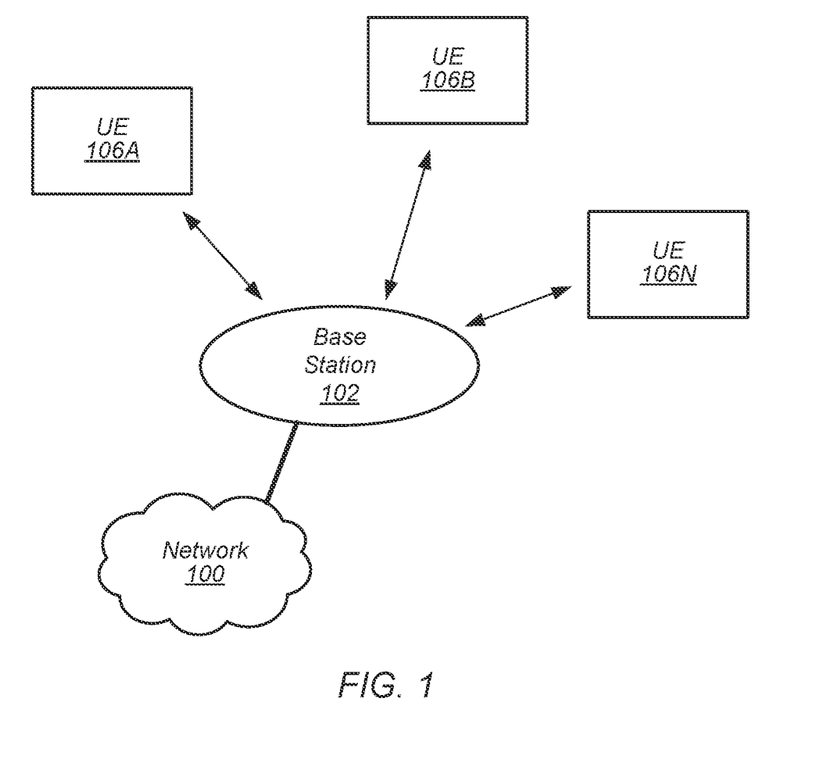
FIG. 1 illustrates an exemplary (and simplified) wireless communication system, according to some embodiments.
Figure 2:
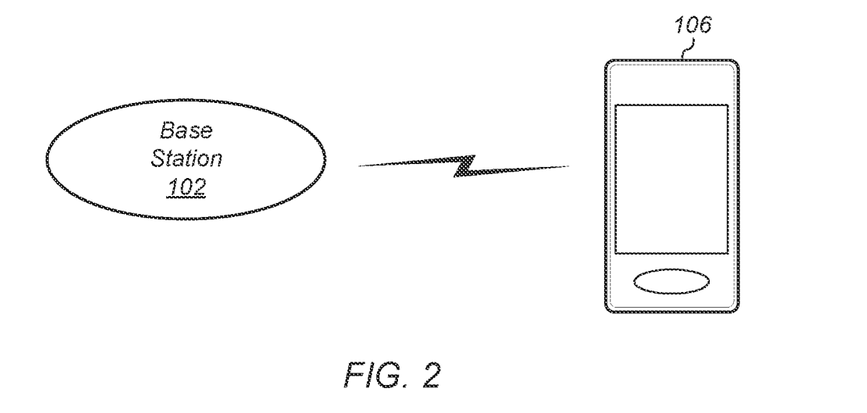
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, neutral host or various CBRS deployments, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HJRPD, eHIRPD), Wi-Fi, WiMAX etc. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
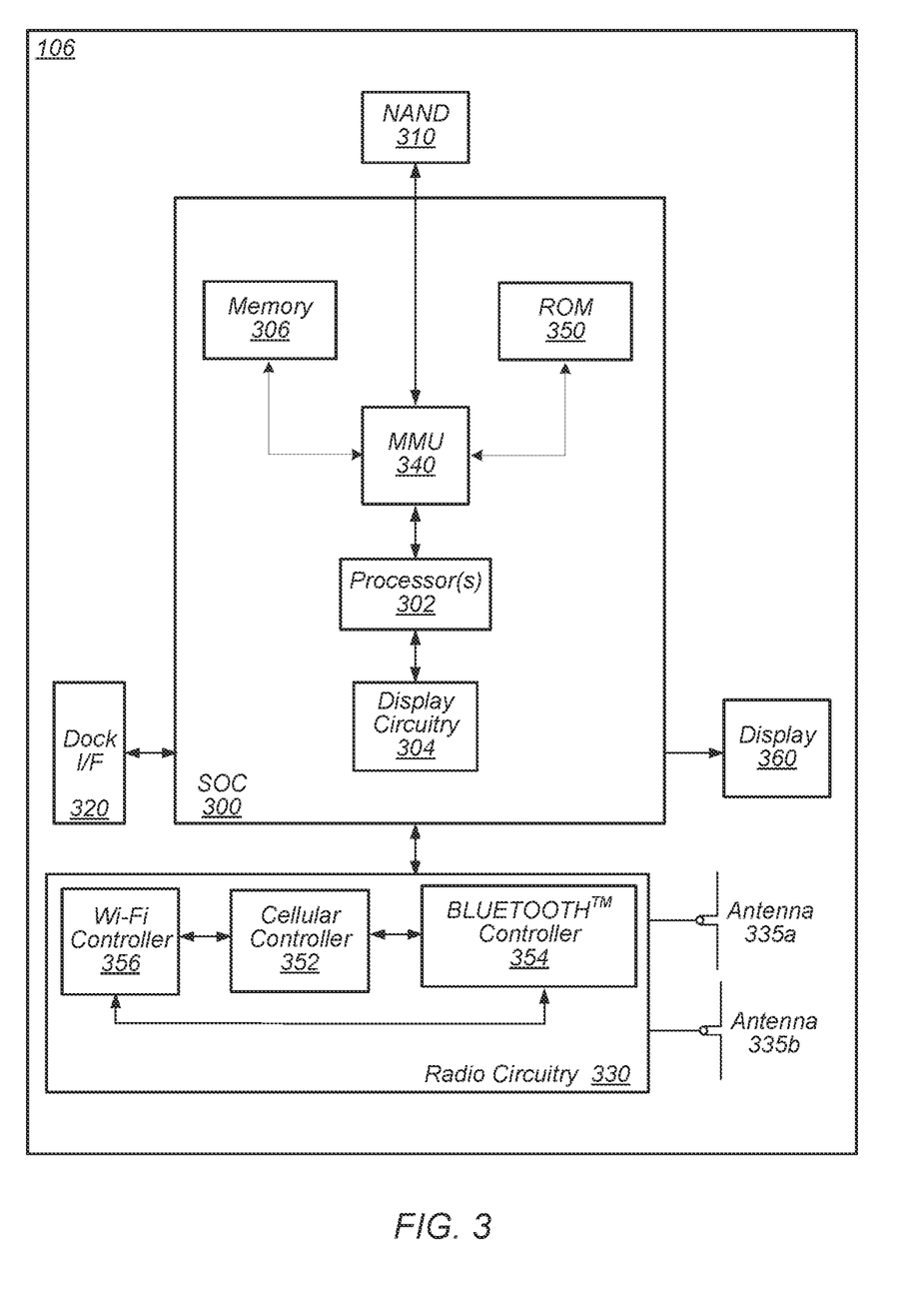
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, e.g., to operate according to various embodiments disclosed herein. Processor(s) 302 may also implement various other applications and/or end-user applications running on UE 106.

In some embodiments, radio 300 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106.

Figure 4:
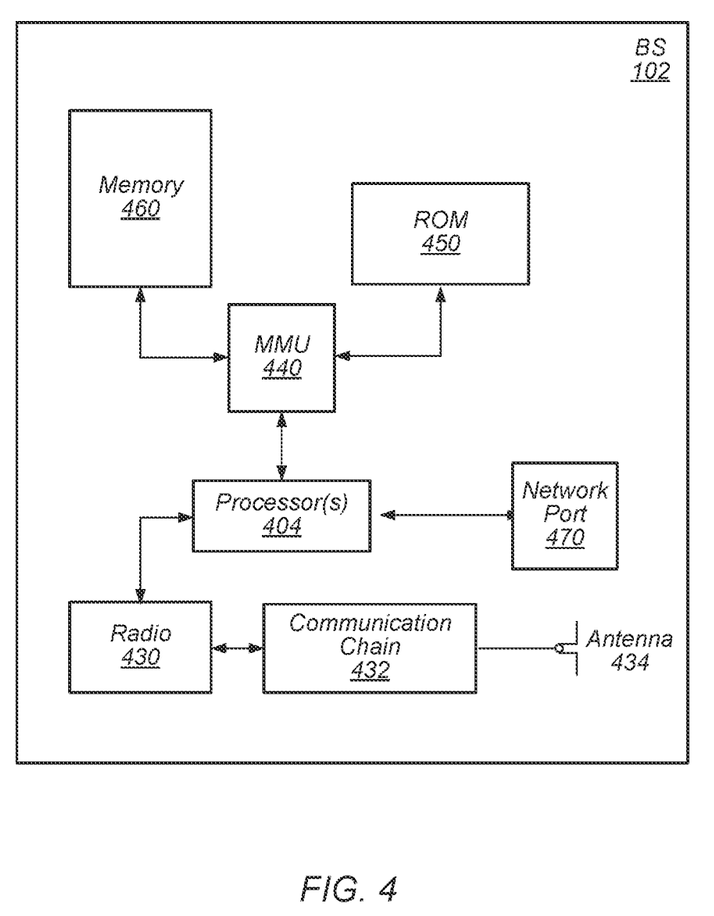
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein.

Figure 5:
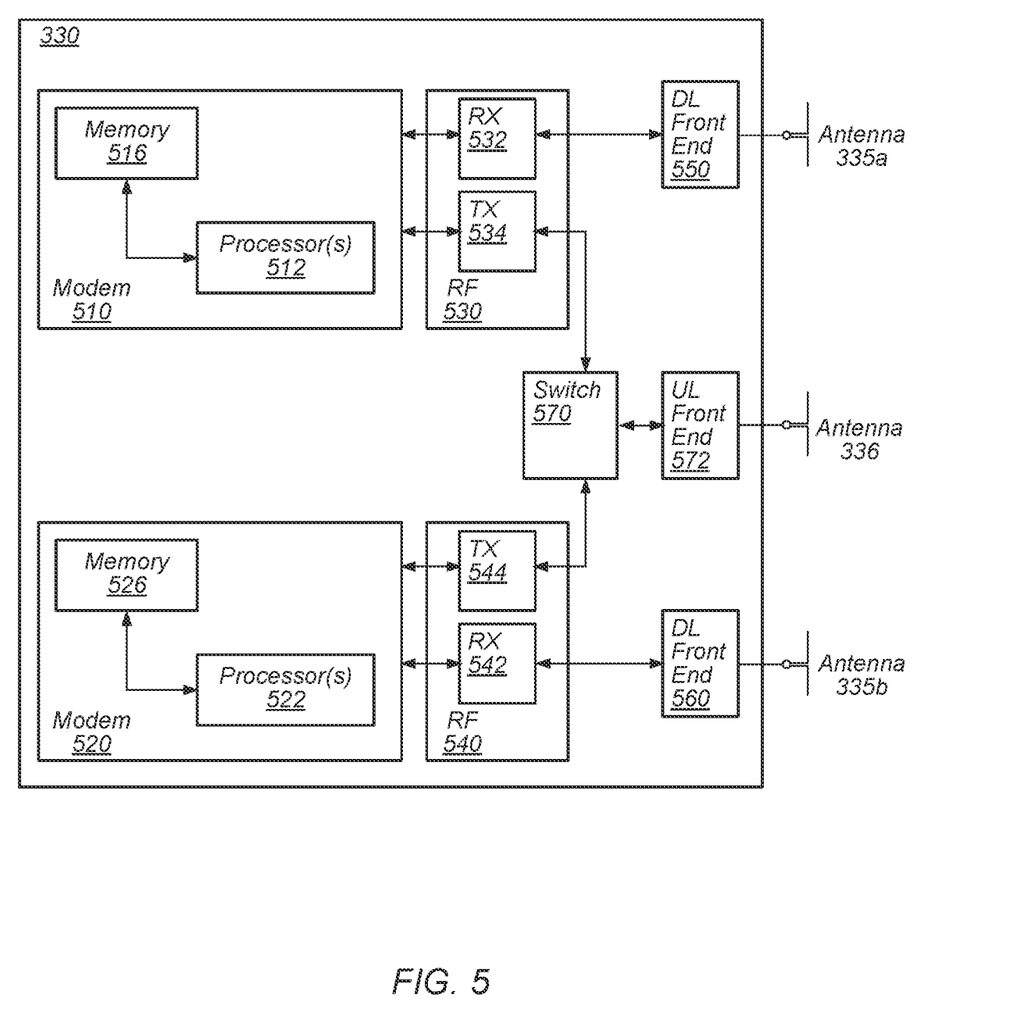
FIG. 5 shows an exemplary diagram illustrating cellular communication circuitry, according to some embodiments.

FIG. 5—Block Diagram of Cellular Communication Circuitry

FIG. 5 illustrates an example simplified block diagram of cellular communication circuitry 330, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
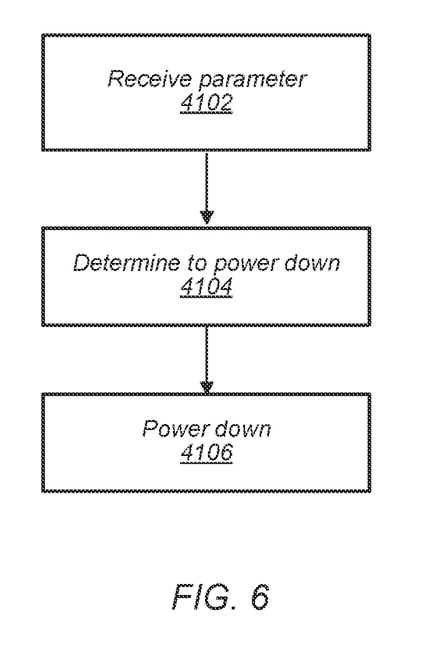
FIG. 6 shows an exemplary flow diagram illustrating a method for powering down based on cross-slot scheduling, according to some embodiments.
Figure 7:
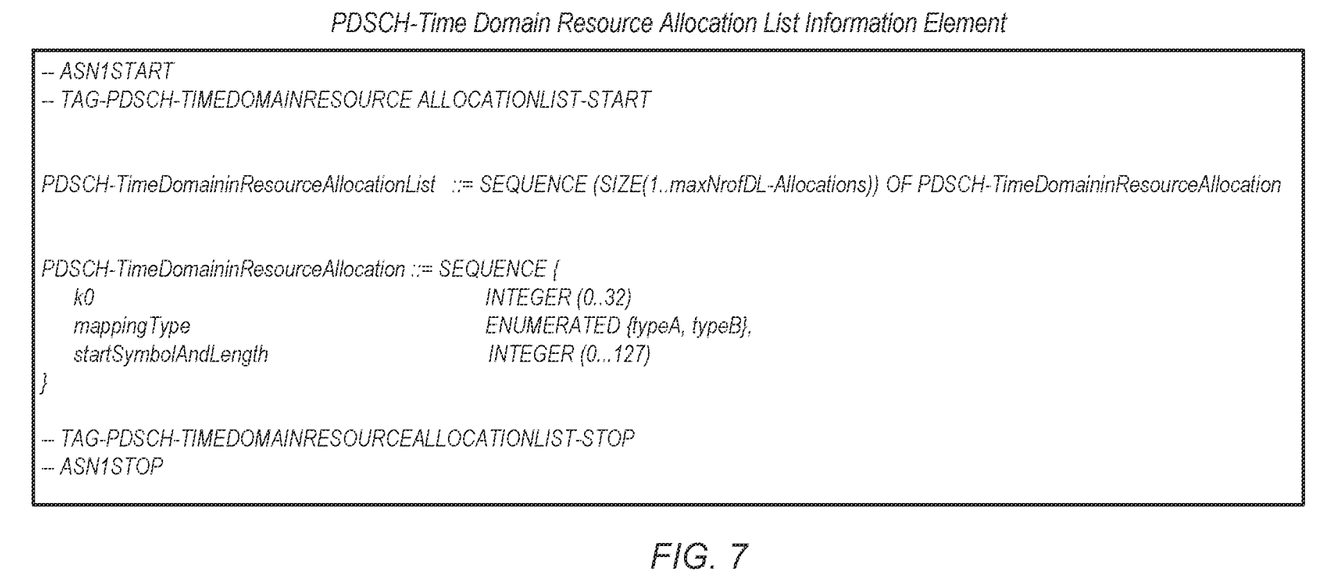
FIG. 7 shows an exemplary information element including scheduling parameters, according to some embodiments.
Figure 8:
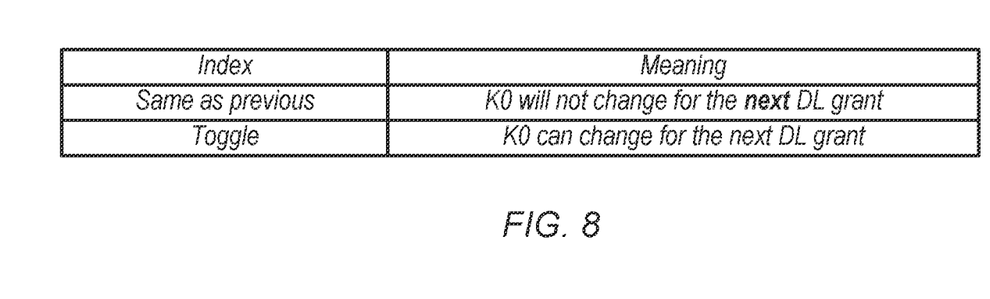
FIG. 8 shows an exemplary table illustrating use of an index as a toggle for K0, according to some embodiments.

FIGS. 6-8—Cross-Slot Scheduling

Some wireless standards (e.g., NR) may permit variable time separation between control information and corresponding data. Control information may correspond to data (e.g., uplink and/or downlink data) to be transmitted during various time periods (e.g., during a same slot or a later slot) as the control information. For example, in NR cross-slot scheduling may refer to a base station transmitting control information (e.g., physical downlink control channel (PDCCH)) during a first slot for corresponding data (e.g., physical downlink shared channel (PDSCH)) during a later slot. Same-slot scheduling may also be permitted. In other words, PDCCH or other control information transmitted in a first slot may correspond to data transmitted in the same slot (e.g., same-slot scheduling) or a later slot (e.g., cross-slot scheduling).

Relative to same-slot scheduling, cross-slot scheduling may allow for some advantages. For example, cross-slot scheduling may allow for power saving at the UE. The UE may achieve such power saving by powering off (or powering down) one or more radio frequency (RF) components of the UE immediately after receiving control information (e.g., prior to decoding the PDCCH and/or downlink control information (DCI)) and leave the components powered off (or down) until needed to receive corresponding data or further control information. Further, the UE may power down one or more baseband components. For example, the wireless device may power down/off at least some receive circuitry, such as one or more receiver chains. The wireless device may leave the RF components powered off/down for the duration of a time period in which data is transmitted (e.g., PDSCH) if no grant is present for the data period. The UE may turn on the RF components for future control information periods and/or for future data periods based on the control information.

Further, cross-slot scheduling may facilitate design simplification and power saving by allowing a gap in time between PDCCH and PDSCH (e.g., or other time periods for control information and data, respectively). Based on decoded control information, the UE may, during the gap in time, configure changes (e.g., in antenna and/or other hardware configuration) for receiving the PDSCH relative to PDCCH. For example, the UE may use one or more of a different beam or different antenna elements to receive PDSCH. For example, PDCCH may use a single-layer reception configuration, whereas PDSCH may use a multi-layer reception configuration, among various possibilities. Also, PDCCH may use a wider beam (e.g., which may provide more robustness) while PDSCH may use a narrower beam (e.g., higher throughput). Similarly, due to a change in position/orientation of the device, it may be beneficial for the UE to use a different directional receive beam for receiving the PDSCH relative to what was used for the PDCCH. The gap may allow time for such configuration changes. In contrast, single-slot scheduling may be beneficial for delay sensitive applications, according to some embodiments.

Various parameters (e.g., scheduling parameters) may be used to configure cross-slot scheduling, in particular the time interval (e.g., delay) between control information and corresponding data (e.g., payload data for an application, or potentially further control information). For example, in NR, the parameter K0 may be defined as the distance (e.g., in time) between PDCCH and the corresponding PDSCH, measured in slots. For example, K0 equal to 0 may indicate same-slot scheduling and K0 greater than 0 may indicate cross-slot scheduling, e.g., PDCCH and its corresponding PDSCH are not scheduled at the same slot. For example, K0 equal to 2 may indicate cross-slot scheduling with the corresponding data transfer (uplink and/or downlink) to occur two slots later.

A set of possible delay values (e.g., values of K0) may be configured by a higher layer (e.g., radio resource control (RRC)), according to some embodiments. For example, a network may configure a set of possible delays (e.g., K0 values) during RRC setup. In some embodiments, K0=0 may typically be included as one of multiple options in such a set.

However, the delay for a specific slot (e.g., transmission time interval (TTI)) may be transmitted in downlink control information (DCI), e.g., via PDCCH. Thus, if the set of possible delay values includes cross-slot (e.g., K0>0) and same-slot (e.g., K0=0) possibilities, a UE may not determine whether the slot is cross-slot scheduled or same-slot scheduled until after DCI is decoded. In other words, the UE may not be able to eliminate the possibility of same-slot scheduling prior to decoding DCI. The time to decode DCI/PDCCH may be referred to as a decoding delay.

This inability to eliminate the possibility of same-slot scheduling prior to decoding DCI may frustrate the benefits of cross-slot scheduling. For example, the UE may keep awake (e.g., not depower components) until after DCI is decoded (e.g., because the UE must be able to receive PDSCH in the event of same-slot scheduling). Thus, the power saving benefit of cross-slot scheduling may be reduced. Further, the decoding delay may create challenges for changing hardware configurations (e.g., antennas, beams, etc.) between PDCCH and PDSCH, e.g., because such changes require time.

Accordingly, it may be desirable, at least in some embodiments, to provide a mechanism for the UE to determine, prior to decoding control information for a particular interval, whether that interval is same-slot scheduled or cross-slot scheduled, or rule out the possibility of same-slot scheduling in at least some circumstances. FIG. 6 is a flow chart diagram illustrating an example of such a method, at least according to some embodiments. Aspects of the method of FIG. 6 may be implemented by a wireless device such as a UE 106 illustrated in various of the Figures herein, a base station such as a BS 102 illustrated in various of the Figures herein, and/or more generally in conjunction with any of the computer systems or devices shown in the above Figures, among other devices, as desired. For example, any of the various devices may include a processor(s) or other processing element(s) (e.g., 302, 330, 352, 354, 356, 404, 512, 522, etc.) configured to cause the device to perform some or all aspects of the method of FIG. 6.

In various embodiments, some of the elements of the methods shown may be performed concurrently, in a different order than shown, may be substituted for by other method elements, or may be omitted. Additional elements may also be performed as desired. Note that while at least some elements of the method of FIG. 6 are described in a manner relating to the use of communication techniques and/or features associated with 3GPP specification documents, such description is not intended to be limiting to the disclosure, and aspects of the method of FIG. 6 may be used in any suitable wireless communication system, as desired. Further, although aspects of the method of FIG. 6 are described relating to downlink transmission, it should be noted that the method may apply to uplink transmission as well. As shown, the method of FIG. 6 may operate as follows.

At 4102, a UE 106 in communication with a base station 102 may receive at least one scheduling parameter transmitted by the base station. The scheduling parameter may be useable by the UE to determine a duration of a delay between control information and corresponding data for at least one time period (e.g., a first slot or a current slot). For example, the scheduling parameter may indicate whether at least one slot is cross-slot scheduled or may be same-slot scheduled. For example, in some cases, the scheduling parameter may allow the UE 106 to rule out the possibility of same-slot scheduling for at least one slot. The scheduling parameter may be applicable for one or more slots.

In some embodiments, the at least one scheduling parameter may be transmitted as a (e.g., RRC) configuration, e.g., setting possible values of K0. For example, the at least one scheduling parameter may be an information element (IE) such as PDSCH-TimeDomainResourceAllocationList, that configures a table with possible values of K0. FIG. 7 is an illustrative example of such a table. In the example of FIG. 7, K0 may range from 0 to 32. It will be appreciated that the illustrated table is exemplary only. A table that includes values of K0 that are all greater than 0 (e.g., a table that does not include K0 equal to 0) may indicate that all slots (e.g., while the RRC configuration is effective) may be cross-slot scheduled. In other words, based on a set of K0 values that are all greater than 0, until the RRC configuration is changed, the UE may be able to determine that all slots are cross-slot scheduled. The UE may thus rule out the possibility of same slot scheduling while the table is applicable. Such an approach may be relatively inflexible.

In some embodiments, the at least one scheduling parameter may be an indication to turn on or off a "freezing K0" feature. Such an indication may be transmitted as a media access control (MAC) control element (CE), e.g., via PDCCH, among various possibilities. Thus, the indication may be used to dynamically adapt K0. Over the duration of an active indication that freezes K0, the K0 value may remain constant (e.g., frozen, locked). K0 may be frozen at a particular value (e.g., as specified by the scheduling parameter) or at a current value of K0 (e.g., K0 is unchanged from the K0 value in effect immediately prior to the scheduling parameter). Based on such an indication that K0 is frozen with K0>0, the UE may be able to determine that all slots are cross-slot scheduled (with a specific delay, as indicated by K0). For example, K0 may be frozen at a first value for a first time period (e.g., slot a to slot b, including any number of intermediate slots) and may be unfrozen for a second time period (e.g., slot b+1 to slot c), and may be frozen at a second value for a third time period (e.g., slot c+1 to slot d). Such a feature may be implemented in at least the following alternative ways.

In a first alternative, the at least one scheduling parameter may indicate activation/deactivation of K0 freezing. As noted above, if K0 is frozen at a current or indicated value (e.g., based on a MAC CE activating freezing), and K0 may not be changed until a later MAC CE deactivates freezing.

In a second alternative, the at least one scheduling parameter may indicate a duration that K0 may remain constant (e.g., frozen, locked). In other words, the scheduling parameter may indicate a duration that K0 may remain at a single value, e.g., a current value or another specified value. Based an such an indication, the UE may determine a number of slots for which K0 may remain at the specified value, e.g., the UE may determine a number of slots that are cross-slot scheduled. The scheduling parameter may indicate start and end times for the duration.

Alternatively, the scheduling parameter may be relative to a current time, e.g., the amount of time that K0 will not be changed from its current value. Such a window may be changed (e.g., extended or possibly shortened) by further indications.

In a third alternative, the at least one scheduling parameter may indicate a minimum delay time (e.g., minimum K0 value, K0_min) to be used for period of time, e.g., until changed. For example, the scheduling parameter may set K0_min equal to 1, thus precluding the possibility of same slot scheduling until K0_min is changed to 0.

It will be appreciated that these alternatives may be used in various combinations. For example, a K0_min value may be provided with a specified duration. For example, the one or more scheduling parameters may indicate that K0 will not be less than 1 for the next 100 slots, etc. Further, a K0_min value may be set and frozen or unfrozen (e.g., activated or deactivated) by further indications. For example, K0_min equal to 2 (e.g., or other value, as desired) may be set and frozen (e.g., activated) by a first indication. The value of K0 may fluctuate (e.g., as indicated in DCI), but may be at least 2 following the first indication. A second indication may unfreeze (e.g., deactivate) K0_min, e.g., so that K0 may be lower for a period of time. In other words, K0 may continue to fluctuate and may go to values lower than 2. A third indication may re-freeze K0_min, e.g., to put the minimum value of 2 (or a different minimum value) back into effect.

Still further, a scheduling parameter indicating one or more future values of K0 and/or K0_min may also be used. For example, a scheduling parameter may be transmitted to indicate that after a first window with a first (e.g., frozen) K0 value, a second (future) window with a second frozen K0 value may be scheduled. For example, K0=1 for the next 10 slots, followed by at least one slot (e.g., or a second window with a second duration) with K0=2, etc. In other words, a schedule of one or multiple K0 and/or K0_min values may be set for any number of future windows. Such a schedule may be set (e.g., indicated) by any number of scheduling parameters transmitted at any time or combination of times.

In some embodiments, the at least one scheduling parameter may be a toggle indicating whether the delay may change for a next slot. Such a toggle may be implemented in various ways, e.g., using an index or flag transmitted as an element of DCI. For example, as shown in FIG. 8, if the value of an index is the same as in a previous slot, the toggle may indicate that K0 will not change for a next slot (e.g., a downlink (DL) grant in a next slot's PDCCH may use the same K0 as a DL grant in the current slot). In contrast, if the index is not the same as in a previous slot, the toggle may indicate that K0 could or will change for the next slot. In order to implement a K0 toggle, the format of DCI could be changed, e.g., by adding 1 bit for such a toggle indication. Such a toggle in DCI may be highly flexible, however it may risk error propagation, according to some embodiments. For example, in the case of missing a grant (e.g., in DCI), a UE may miss two PDSCH for two slots in a row.

In some embodiments, the BS 102 may dynamically determine whether to apply cross-slot or same-slot scheduling for the UE 106 during one or more slots. The BS 102 may further determine a scheduling parameter or combination of scheduling parameters to indicate to the UE which type of scheduling is applicable to one or more slots. For example, when the BS 102 determines to apply cross-slot scheduling, the BS 102 may use any of the various techniques described above to indicate cross-slot scheduling (e.g., to indicate to the UE 106 that K0 will not equal 0 for the slot(s) for which the scheduling parameter is applicable). The BS 102 may transmit the scheduling parameter(s) to the UE 106. The BS 102 may update the scheduling determination dynamically (e.g., periodically, or as needed, etc.) and may transmit additional (e.g., updated) scheduling parameters to the UE according to the updated determination. The scheduling parameter(s) may be transmitted prior to the slot(s) to which the scheduling parameter(s) applies, e.g., so that the UE can make a determination of cross-slot scheduling or same-slot scheduling prior to receiving control information in a relevant slot. For example, in order to allow the UE to realize the benefits of cross-slot scheduling during a first slot, the BS may transmit the scheduling parameter(s) to the UE (e.g., indicating cross-slot scheduling for the first slot) prior to the first slot. During the first slot, the BS may transmit control information to the UE. The control information may be consistent with the scheduling parameter(s). For example, if the scheduling parameter(s) indicates cross-slot scheduling for the first slot, the control information transmitted during the first slot may apply to a data transfer or other communication (e.g., uplink and/or downlink) scheduled for a later slot or slots (e.g., one or slots following the first slot, e.g., immediately after the first slot or after one or more intermediate slots, e.g., consistent with K0). Further, the BS may perform the scheduled transfer or communication with the UE during the later slot(s).

In 4104, based on the at least one scheduling parameter, the UE may determine whether to power down at least some components after receiving control information during a slot (e.g., a current slot). The determination of whether to power down any component(s) may be made before, after, or while the UE receives the control information. The slot may be a slot during which the at least one scheduling parameter is in effect.

In other words, the UE may determine, based on the at least one scheduling parameter, that a delay between the control information and corresponding data is (or is not) sufficient to power off or power down one or more components, e.g., that the corresponding data will not immediately follow the control information. For example, the UE may determine that the scheduling parameter is an indication of cross-slot scheduling for the current slot. In other words, the UE may determine that control information of a current slot is cross-slot scheduled, e.g., that the control information applies to a later slot, and may thus determine that no data (e.g., PDSCH) will be transmitted for the UE during the current slot (e.g., the slot for which the determination is made). Among various possibilities, the UE may determine that cross-slot scheduling applies based on any of the following: 1) an RRC configuration that does not include K0 equal to 0 (e.g., K0 is greater than 0), 2) K0 is frozen at a value of K0 greater than 0, 3) K0_min is in effect and is greater than 0, and/or 4) K0 of a previous slot is greater than 0 and a toggle indicates that K0 will not change for the current slot. Similarly, the UE may determine that same-slot scheduling is possible if none of the previous conditions is true. If same-slot scheduling is possible, the UE may determine not to power down components after receiving he control information.

In some embodiments, the UE may further consider control information from one or more prior slots to make this determination. For example, the UE may determine whether or not control information received in a prior slot is associated with a current slot (e.g., cross-slot scheduling). If a prior slot's control information included a downlink grant for the current slot, the UE may determine not to power off any components. Thus, the UE may remain active/awake to receive the data (e.g., PDSCH) corresponding to previously received and decoded control information (e.g., PDCCH).

In some embodiments, the UE may further determine which specific components to power off and/or power down. Such components may include any of receive circuitry, RF components, baseband circuitry, antennas, receiver chains, etc. The specific components to be powered off/down may be selected based on the length of the delay and/or the amount of time necessary to power the component off and back on, according to some embodiments. For example, in some embodiments it may be possible to more quickly power/depower one element (e.g., RF circuitry or a baseband processor) relative to other components of the receiver chain; e.g., some elements may have a shorter "power-off time" or "cycle time" than other elements. Thus, under some circumstances, an opportunity may exist to save power by temporarily depowering one or more elements without depowering the remainder of the chain (e.g., because the amount of time to depower and repower the remaining components may exceed the amount of time before those components may be needed). In other words, specific elements may be selected to power off based on a comparison of the power-off time and a transmission time interval (TTI) associated with an active communication session.

In 4106, based on a determination to power down, the UE may power down at least one component after receiving the control information of a current time interval/slot and prior to decoding the control information. To power down a component may include partly or fully depowering the component. For example, a component may be powered off or remain operating at a reduced power level (e.g., and potentially at a reduced performance/capability).

The components may remain powered off/down for any length of time. For example, the components may remain power off/down until a period associated with control information in a subsequent slot. For example, after receiving PDCCH of a current slot during a current control information receiving period, the UE may power off/down components, and they may remain powered off/down for the remainder of the slot. The components may be powered back up/on for a next control information receiving period, e.g., in time to receive PDCCH of a next slot. The UE may decode the control information while the components are powered off/down.

The control information may be or include DCI transmitted via PDCCH. The control information may specify any delay between the control information and corresponding data, e.g., K0. For example, the control information may indicate a particular time for the UE to receive and/or transmit corresponding downlink and/or uplink data. The UE may power on the component(s) in order to receive and/or transmit the corresponding downlink and/or uplink data at the particular time, e.g., in a future slot specified by the control information.

In some embodiments, the control information may include a further scheduling parameter, e.g., one or more of the scheduling parameters discussed above in 4102. Such a further scheduling parameter may be applicable to further control information to be received in a future slot. For example, the further scheduling parameter may be useful to determine what slot(s) may include data corresponding to the future control information. In other words, the further scheduling parameter(s) may be usable to determine whether or not the future control information may be cross-slot scheduled and thus whether or not components may be depowered in future slots.

In some embodiments, in response to a determination that same-slot scheduling is possible for the current slot, the UE may not power down any components after receiving the control information.

In the following, exemplary embodiments are provided.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In one set of embodiments, a method may comprise, by a wireless device: receiving a scheduling parameter from a base station, wherein the scheduling parameter comprises an indication of cross-slot scheduling; determining, based at least in part on the scheduling parameter, to power down at least one component after receiving control information from the base station; receiving the control information from the base station; powering down the at least one component after receiving the control information; and decoding the control information.

In some embodiments, the method may further comprise: powering on the at least one component; and receiving second control information from the base station.

In some embodiments, the scheduling parameter comprises a media access control (MAC) control element (CE).

In some embodiments, said determining is further based at least in part on previously received control information.

In some embodiments, the scheduling parameter comprises an indication that a value of K0 is greater than 0 for a current slot.

In some embodiments, the scheduling parameter comprises an indication that a value of K0 is frozen.

In some embodiments, the scheduling parameter comprises an indication that a value of K0 is greater than a minimum value.

In some embodiments, the scheduling parameter comprises an indication that a value of K0 is unchanged from a previous value of K0.

In some embodiments, the method may further comprise: receiving a radio resource control (RRC) configuration from the base station, wherein the RRC configuration specifies a plurality of scheduling options comprising same-slot scheduling and cross-slot scheduling, wherein said determining comprises ruling out same-slot scheduling.

In some embodiments, the method may further comprise: receiving an indication of a duration of the scheduling parameter.

In some embodiments, said decoding occurs while the at least one component is powered down.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A user equipment device (UE), comprising:
a receiver chain; and
a processor, operably connected to the receiver chain and configured to cause the UE to:
establish a wireless connection with a base station;
receive, from the base station in a first slot, a scheduling parameter in a downlink control information (DCI) message indicating a minimum K0 value (K0_min value), wherein the K0_min value is a minimum slot offset for cross-slot scheduling of corresponding data applicable starting from a second slot that is subsequent to the first slot, wherein the scheduling parameter is indicated as a 1-bit index;
determine, based on the K0_min value, that first control information arriving at or after the second slot uses cross-slot scheduling with a minimum slot offset of K0_min;
receive, from the base station, the first control information during the second slot; and
decode the first control information to determine a slot offset, K0, for data corresponding to the first control information, wherein the slot offset, K0, is greater than or equal to the K0_min value.

2. The UE of claim 1, wherein the processor is further configured to cause the UE to:
receive a radio resource control (RRC) configuration from the base station, wherein the RRC configuration specifies a plurality of scheduling options including same-slot scheduling and cross-slot scheduling, wherein to determine that the first control information arriving at or after the second slot uses cross-slot scheduling with a minimum slot offset of K0_min is based on ruling out same-slot scheduling for the second slot.

3. The UE of claim 1, wherein the processor is further configured to cause the UE to:
power down the receiver chain prior to decoding the first control information;
repower the receiver chain for a third slot subsequent to the second slot;
receive, from the base station, second control information including an updated scheduling parameter;
determine that the updated scheduling parameter indicates same-slot scheduling for a fourth slot subsequent to the third slot; and
in response to the determination that the updated scheduling parameter indicates same-slot scheduling for the fourth slot, determine not to power down the receiver chain prior to decoding control information received during the fourth slot.

4. The UE of claim 1, wherein the scheduling parameter includes a media access control (MAC) control element (CE).

5. The UE of claim 1, wherein the processor is further configured to cause the UE to:
power down the receiver chain prior to decoding the first control information, wherein said powering down the receiver chain is further based at least in part on previously received control information.

6. The UE of claim 1, wherein the processor is further configured to cause the UE to:
receive second control information changing the K0_min value.

7. The UE of claim 1, wherein the processor is further configured to cause the UE to:
receive, from the base station, second control information including an updated scheduling parameter; and
determine that the updated scheduling parameter indicates same-slot scheduling for a third slot subsequent to the second slot.

8. An apparatus, comprising:
a processor configured to cause user equipment device (UE) to:
establish a wireless connection with a base station;
receive, from the base station in a first slot, a scheduling parameter in a downlink control information (DCI) message indicating a minimum K0 value (K0_min value), wherein the K0_min value is a minimum slot offset for cross-slot scheduling of corresponding data applicable starting from a second slot subsequent to the first slot, wherein the scheduling parameter is indicated as a 1-bit index;
determine, based on the K0 _min value that first control information arriving at or after the second slot uses cross-slot scheduling with a minimum slot offset of K0_min;
receive, from the base station, the first control information during the second slot; and
decode the first control information to determine a slot offset, K0, for data corresponding to the first control information, wherein the slot offset, K0, is greater than or equal to the K0_min value.

9. The apparatus of claim 8, wherein the processor is further configured to cause the UE to:
receive a radio resource control (RRC) configuration from the base station, wherein the RRC configuration specifies a plurality of scheduling options including same-slot scheduling and cross-slot scheduling, wherein to determine that the first control information arriving at or after the second slot uses cross-slot scheduling with a minimum slot offset of K0_min is based on ruling out same-slot scheduling for the second slot.

10. The apparatus of claim 8, wherein the processor is further configured to cause the UE to:
power down a receiver chain prior to decoding the first control information;
repower the receiver chain for a third slot subsequent to the second slot;
receive, from the base station, second control information including an updated scheduling parameter;
determine that the updated scheduling parameter indicates same-slot scheduling for a fourth slot subsequent to the third slot; and
in response to the determination that the updated scheduling parameter indicates same-slot scheduling for the fourth slot, determine not to power down the receiver chain prior to decoding control information received during the fourth slot.

11. The apparatus of claim 8, wherein the scheduling parameter includes a media access control (MAC) control element (CE).

12. The apparatus of claim 8, wherein the processor is further configured to cause the UE to:
power down a receiver chain prior to decoding the first control information, wherein said powering down the receiver chain is further based at least in part on previously received control information.

13. The apparatus of claim 8, wherein the processor is further configured to cause the UE to:
receive second control information changing the K0_min value.

14. The apparatus of claim 8, wherein the processor is further configured to cause the UE to:
receive, from the base station, second control information including an updated scheduling parameter; and
determine that the updated scheduling parameter indicates same-slot scheduling for a third slot subsequent to the second slot.

15. A method, comprising:
by a base station of a cellular network:
establishing communication with a user equipment device (UE);
at a first slot, transmitting, to the UE, a scheduling parameter in a downlink control information (DCI) message indicating a minimum K0 value (K0_min value), wherein the K0_min value is a minimum slot offset for cross-slot scheduling of corresponding data applicable starting from a second slot subsequent to the first slot, wherein the scheduling parameter is indicated as a 1-bit index;
during the second slot, transmitting, to the UE, first control information indicating a slot offset, K0, for data corresponding to the first control information, wherein the slot offset, K0, is greater than or equal to the K0_min value; and
performing communication with the UE according to the first control information.

16. The method of claim 15, the method further comprising:
transmitting, to the UE, a radio resource control (RRC) configuration, wherein the RRC configuration specifies a plurality of scheduling options comprising same-slot scheduling and cross-slot scheduling.

17. The method of claim 15, wherein the scheduling parameter includes a media access control (MAC) control element (CE).

18. The method of claim 15, wherein the first control information includes an indication that a value of K0 is the same as in a previous slot.

19. The method of claim 15, wherein the first control information includes an indication of a toggle for K0.

20. The method of claim 15, wherein the scheduling parameter includes an indication of a duration of the scheduling parameter.

* * * * *